(12) United States Patent
Sibigtroth et al.

(10) Patent No.: US 7,881,813 B2
(45) Date of Patent: Feb. 1, 2011

(54) SYSTEM AND METHOD FOR SHARING RESET AND BACKGROUND COMMUNICATION ON A SINGLE MCU PIN

(75) Inventors: James M. Sibigtroth, Round Rock, TX (US); Dionicio Garcia, III, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 906 days.

(21) Appl. No.: 11/424,767

(22) Filed: Jun. 16, 2006

(65) Prior Publication Data

US 2008/0004752 A1    Jan. 3, 2008

(51) Int. Cl.
    *G05B 11/01*    (2006.01)
    *G01R 31/28*    (2006.01)
(52) U.S. Cl. .................. 700/26; 710/313; 717/124; 714/715; 714/733
(58) Field of Classification Search ............ 700/26, 700/260; 710/305, 313; 717/124, 126, 129, 717/131, 134, 135; 714/715, 733
See application file for complete search history.

(56) References Cited

U.S. PATENT DOCUMENTS 6,292,911 B1 * 9/2001 Swanson .................. 714/715

7,028,240 B1 * 4/2006 Bautista et al. ............ 714/733

OTHER PUBLICATIONS

Freescale Semiconductor, "MC9S08GB60A Data Sheet, HCS08 Microcontrollers—Rev. 1.00", Aug. 2005 Retrieved from the Internet—www.freescale.com/files/microcontrollers/doc/data_sheet/MC9S08GB60A.pdf.*
Freescale Semiconductor, "MC9S06GB60A Data Sheet, HCS06 Microcontrollers—Rev. 1.00" Aug. 2005.*
International Search Report for correlating PCT Patent Application No. PCT/US 07/66547 dated Mar. 7, 2008.

* cited by examiner

*Primary Examiner*—Paul L Rodriguez
*Assistant Examiner*—Sheela Rao
(74) *Attorney, Agent, or Firm*—VanLeeuwen & VanLeeuwen; Susan Hill

(57) ABSTRACT

Methods and data processing systems are provided to share a common pin between two circuits in microcontroller unit (MCU). Signals are received at a common pin included in the MCU. If the first circuit has been enabled, then the received signals are analyzed to determine whether the signals are valid command signals for the first circuit. If the signals are not a valid command signal, then a second circuit is performed. If the first circuit has not been enabled, then an alternate function is performed. One of the operations performed by the alternate function is to determine whether to enable the first function. In one embodiment, the first circuit is a background debug controller of the MCU and the second circuit is a reset circuit.

20 Claims, 7 Drawing Sheets

US 7,881,813 B2

SYSTEM AND METHOD FOR SHARING RESET AND BACKGROUND COMMUNICATION ON A SINGLE MCU PIN

FIELD OF THE INVENTION

The present invention relates generally to a system and method for sharing a communications pin on a microcontroller unit (MCU). More particularly, the present invention relates to a system and method for sharing background communications and reset signals at a single MCU pin.

RELATED ART

A microcontroller unit (MCU) is a single chip that includes various components such as a processor, random-access memory (RAM), read-only memory (ROM), a clock, and an input/output (I/O) control unit. A microcontroller can be thought of as a "computer on a chip." Hundreds of millions of MCUs are used in a vast amount of applications from automobile and appliance applications to toys and games. Many microcontrollers can be quite small and inexpensive. Modern automobiles, for example, may include many MCUs to control various functions.

Because of their small size, some MCUs have limited communication pins for communicating with external devices. While it is desirable to have dedicated communication pins for various functions, this becomes challenging when the number of pins are limited. Background communications and reset functions are desirable in many applications, such as in automotive MCUs. However, with traditional MCU pin limitations, having dedicated communication pins for background and reset functions is often not possible. In some automotive MCU applications, an expansion bus is not available, so traditional emulation is not possible and background debugging is often desirable.

One possible solution is to increase the number of pins on the MCU. A challenge of this approach, however, is that changing the number of pins in somewhat standardized MCUs, such as those used in automotive industries, causes changes to how the MCUs are connected to the electrical system. A standard MCU may only have six or eight pins in order to allow it to fit into small applications. Adding an extra pin could result in an undesirable larger package.

Another possible solution is to forego some functionality. For example, in an automotive application, one pin can be dedicated for reset, in which case background communications will be disabled. This solution has obvious shortcomings in that some functionality cannot be utilized. Not having background communications, for example, would inhibit the ability to diagnose or debug the MCU. This is especially true in situations where traditional emulation is not possible.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
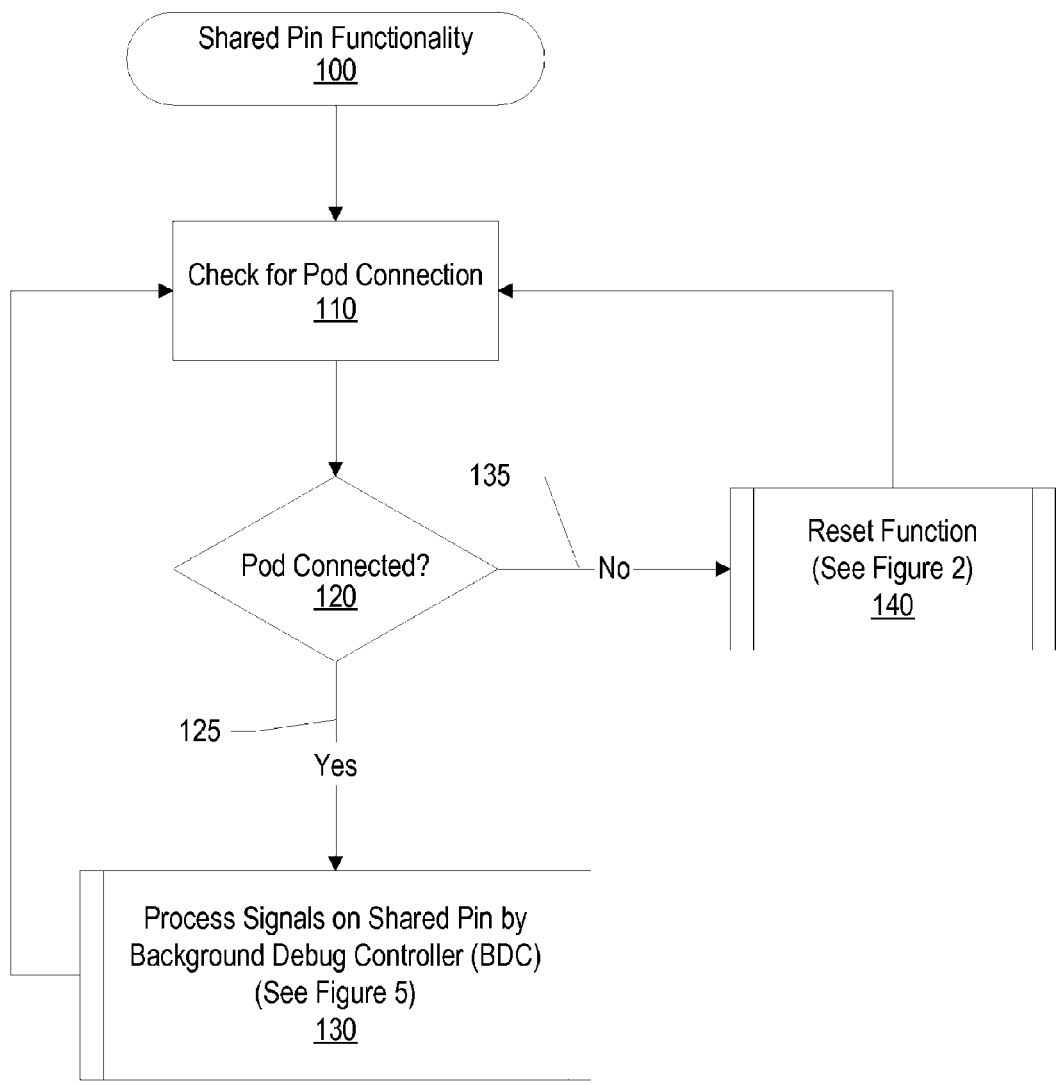
FIG. 1 is a high-level flowchart showing shared pin functionality.

FIG. 1 is a high-level flowchart showing shared pin functionality. Processing commences at 100 whereupon, at step 110, a check is made to see whether an external device is connected to the microcontroller unit (MCU). A "pod" is a common example of an external debugging device that maybe connected to an MCU. A pod allows the operator to communicate with the MCU using various commands. A determination is made as to whether an external device (e.g., a pod) is connected to the MCU (decision 120). If an external device is connected to the device (MCU), then decision 120 branches to "yes" branch 125 and the received signals are processed by a first circuit that has been enabled at the device (predefined process 130, see FIG. 5 and corresponding text for processing details). In one embodiment, the first circuit is a Background Debug Controller (BDC) circuit (see, e.g., FIGS. 6 and 7 and their corresponding text for details regarding one embodiment of a BDC).

Figure 2:
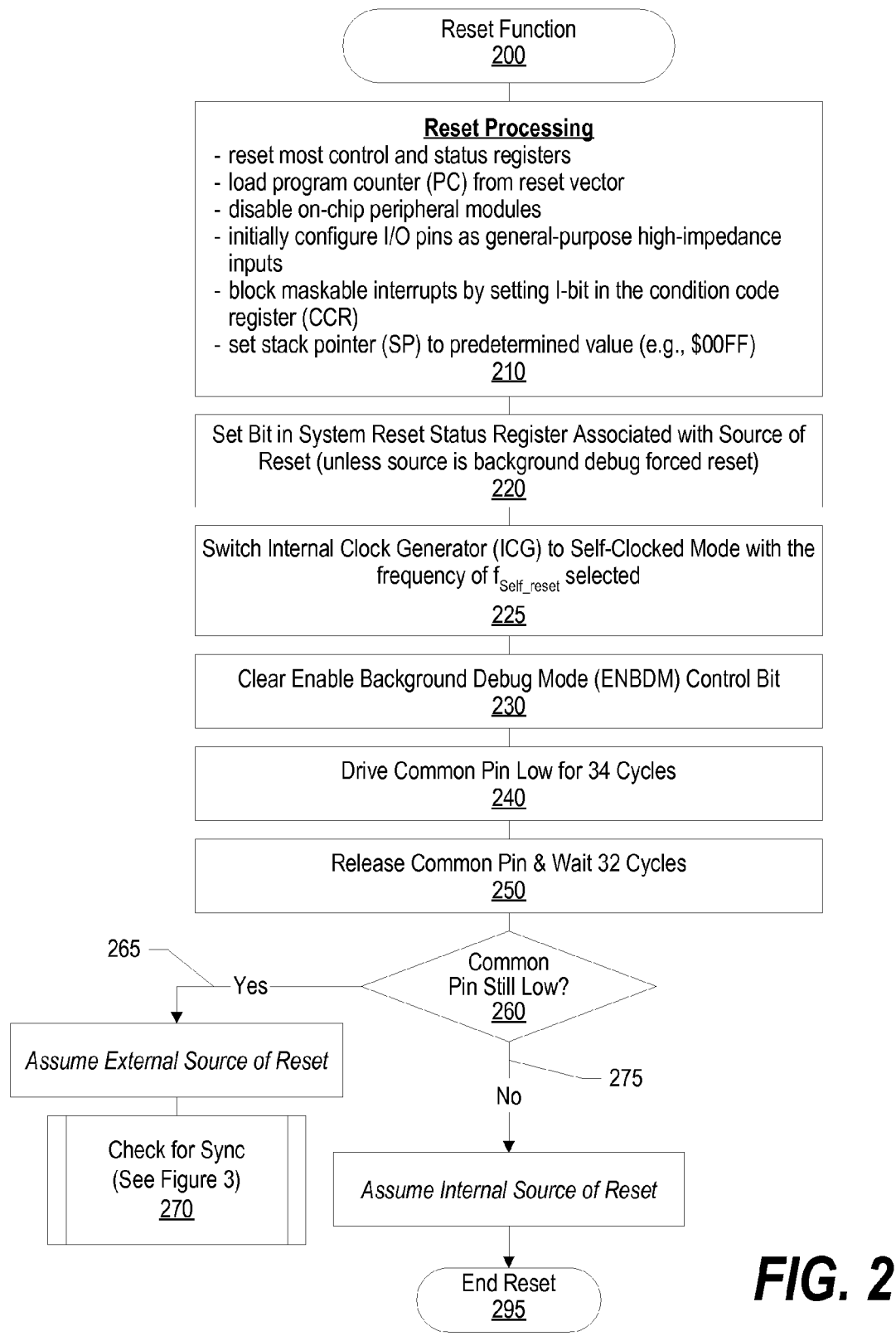
FIG. 2 is a flowchart showing the steps taken during a reset function of a microcontroller unit (MCU)

On the other hand, if an external device is not connected to the device (MCU), then decision 120 branches to "no" branch 135 whereupon a second function is performed by a second circuit (predefined process 140, see FIG. 2 and corresponding text for processing details). In one embodiment, the second circuit is a Reset circuit (see, e.g., FIGS. 2, 6, and 7 and their corresponding text for details regarding one embodiment of a reset circuit).

After the respective first and second functions are performed, processing loops back to check whether an external device is connected. While the two functions that share the common pin are shown as being a Background Debug Controller function and a Reset function, those of skill in the art will appreciate that other functions are able to share a common pin using the techniques and teachings described herein.

FIG. 2 is a flowchart showing the steps taken during a reset function of a microcontroller unit (MCU). Processing commences at 200 whereupon, at step 210, standard reset processing occurs. In one embodiment, standard reset processing includes resetting most of the control and status registers, loading the program counter (PC) from a reset vector, disabling on-chip peripheral modules, initially configuring I/O pins as general-purpose high-impedance inputs, blocking maskable interrupts by setting I-bit in the condition code register (CCR), and setting the stack pointer (SP) to a predetermined value.

At step 220, the reset function sets a bit in the system reset status register that is associated with the source of the reset. As noted, this bit is set unless the source of the reset is a forced reset received as a background debug command. At step 225, the reset function switches the Internal Clock Generator to self-clocked mode with a certain frequency ($f_{Self\_reset}$) selected.

At step 230, the Enable Background Debug Mode (ENBDM) control bit is cleared. This is a control bit associated with the first function. If the first function (e.g., the Background Debug Controller) was enabled when the reset function was invoked, then step 230 will effectively disable the first function. As will be seen, however, the first function can be re-enabled before reset processing is finished (see FIG. 3, step 340).

Steps 240 and 250 operate to drive and release the common pin in order to determine whether there is an external source of the reset. Step 240 drives the common pin low for a certain number of cycles. In one embodiment, the common pin is driven low for 34 cycles. Step 250 releases the common pin and waits for a certain number of cycles. In one embodiment, the common pin is released for 32 cycles.

After the common pin has been driven and released for a given number of cycles, a determination is made as to whether the common pin is still being driven low (decision 260). If the common pin is still being driven low, decision 260 branches to "yes" branch 265 which assumes that there is an external source of the reset and, therefore, a synchronization check is made to see if an external device, such as a pod, is attempting to synchronize with the device (MCU). This synchronization check is made at predefined process 270 (see FIG. 3 and corresponding text for processing details). During synchronization processing, the first circuit (e.g., the BDC circuit) can be re-enabled if a good synchronization is established with the external device and a valid command is received.

On the other hand, if the common pin is not still being driven low, decision 260 branches to "no" branch 275 whereupon it is assumed that the reset was caused by an internal source so no synchronization checking is performed and the reset function exits at 295.

Figure 3:
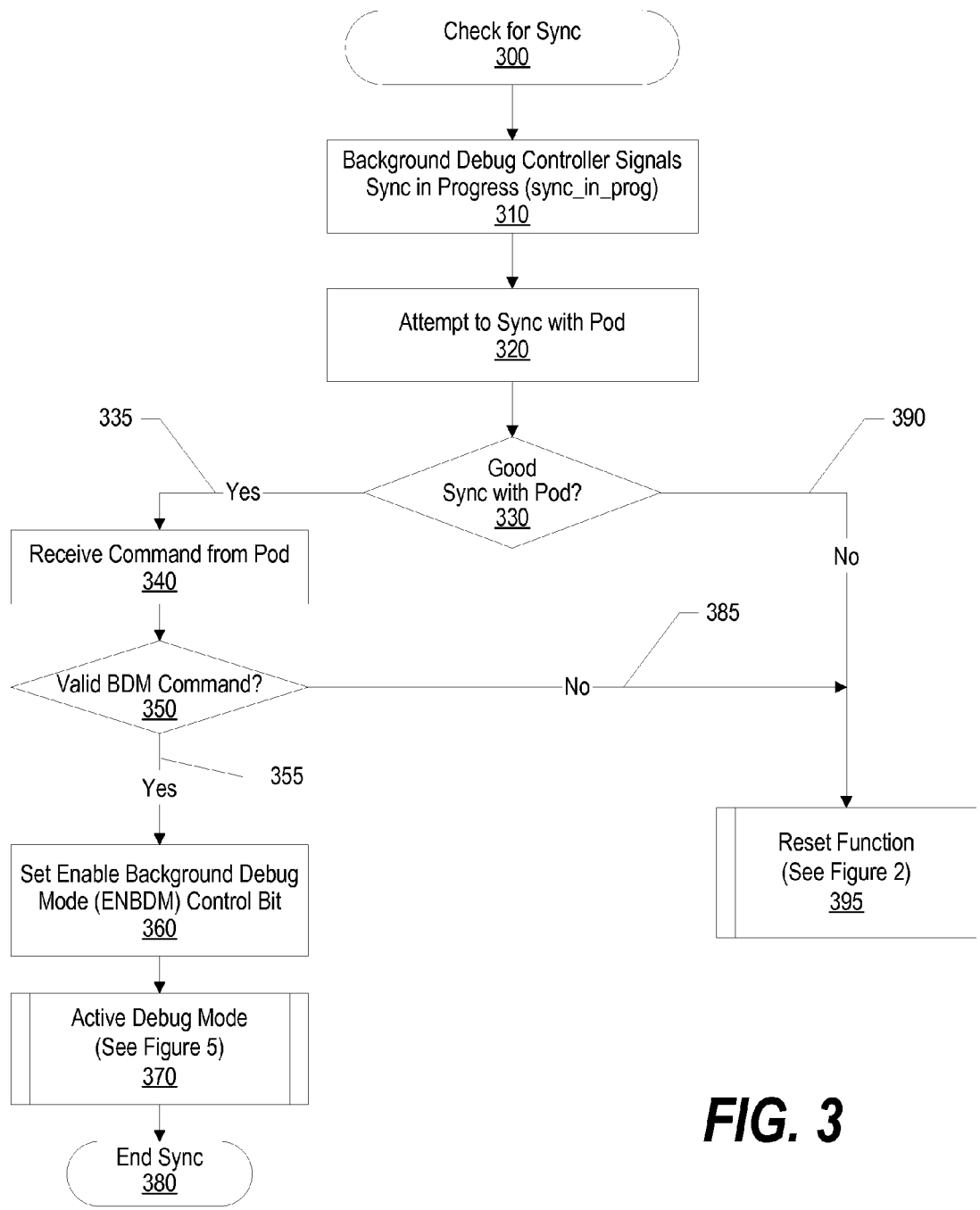
FIG. 3 is a flowchart showing the steps taken when checking for a synchronization between the MCU and an external device, such as a pod.

FIG. 3 is a flowchart showing the steps taken when checking for synchronization between the MCU and an external device, such as a pod. Processing commences at 300 whereupon, at step 310, the first circuit (e.g., the Background Debug Controller (BDC) circuit) signals that a synchronization event is in progress (sync_in_prog). At step 320, the device (MCU) attempts to synchronize with the external device, such as a pod.

A determination is made as to whether the device (MCU) successfully synchronized with the external device (decision 330). If a successful synchronization was established, decision 330 branches to "yes" branch 335 whereupon, at step 340, the MCU receives a command from the external device.

A determination is made as to whether a valid Background Debug Mode (BDM) command was received from the external device (decision 350). If a valid BDM command was received, then decision 350 branches to "yes" branch 355 whereupon, at step 360, the first circuit (e.g., Background Debug Controller circuit) is enabled by setting a control bit (e.g., setting ENBDM to 'true'), and the device (MCU) enters active debug mode (predefined process 370, see FIG. 5 and corresponding text for processing details). Synchronization processing thereafter ends at 380.

On the other hand, if a valid BDM command was not received, decision 350 branches to "no" branch 385 bypassing steps 360 and 370 and the reset function is performed (predefined process 395, see FIG. 2 and corresponding text for processing details). Likewise, returning to decision 330, if a successful synchronization was not established between the device (MCU) and the external device (pod), then decision 330 branches to "no" branch 390 and the reset function is performed at predefined process 395.

Figure 4:
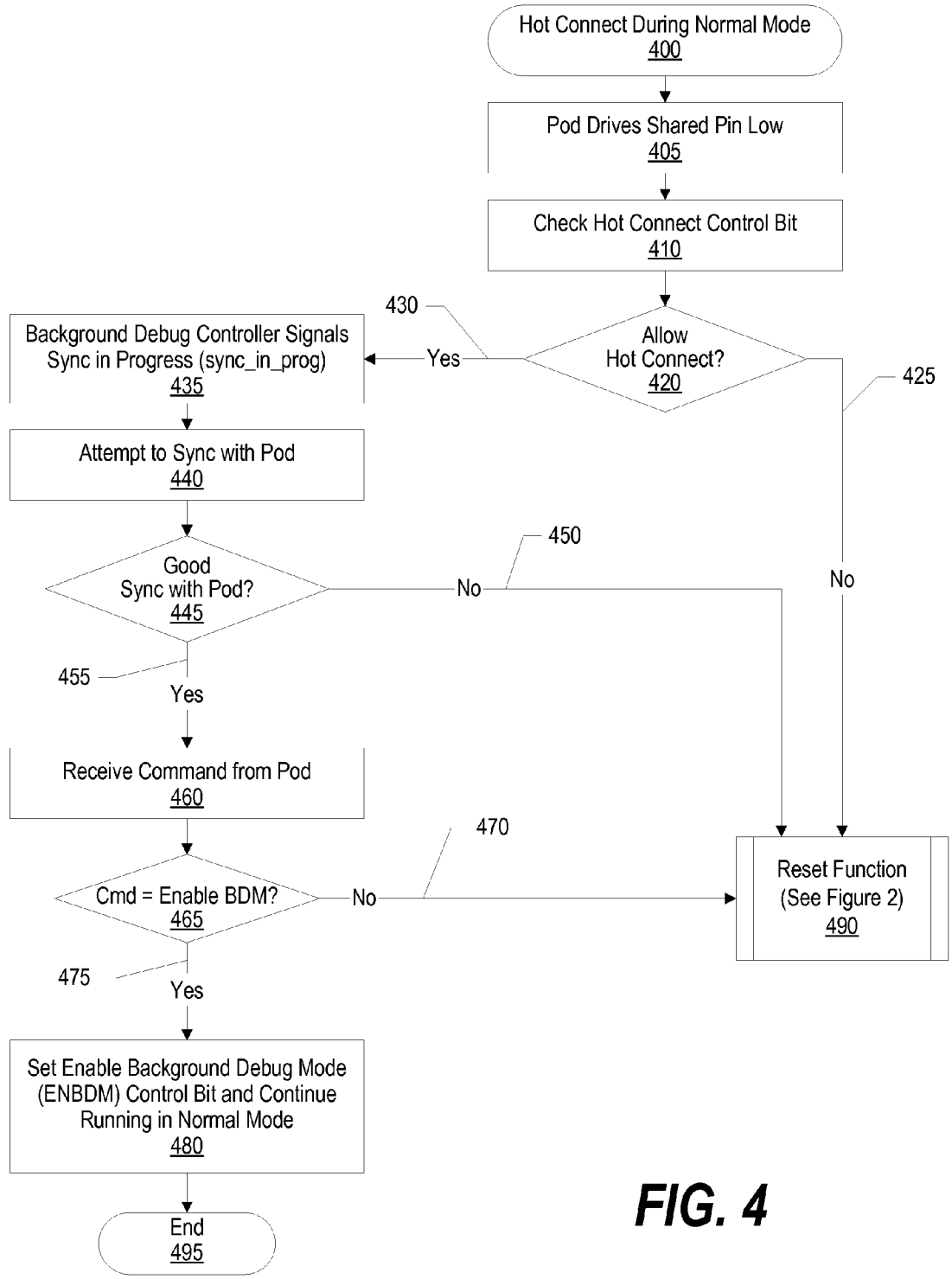
FIG. 4 is a flowchart showing the steps taken during a hot connect between the MCU and the external device.

FIG. 4 is a flowchart showing the steps taken during a hot connect between the device (MCU) and an external device, such as a pod. In one embodiment, a successful hot connect connects an external device with a running MCU in a manner that permits background communications between the external device and the MCU without resetting the MCU. Processing commences at 400 whereupon, at step 405, the external device drives the shared pin low. At step 410, a hot connect control bit is read in the target MCU. The hot connect control bit determines whether hot connections are allowed between the device and external devices. In one embodiment, the hot connect control bit is permanently cleared to disable hot connections when the MCU is initially configured. In another embodiment, the hot connect control bit can be altered after initial configuration, such as by user instructions in normal operating mode. If hot connections are allowed, then the first circuit (e.g., Background Debug Controller circuit) can be enabled without having to reset the MCU.

A determination is made as to whether the MCU allows hot connections (decision 420), based on the hot connect control bit. If the device (MCU) does not allow hot connections, then decision 420 branches to "no" branch 425 whereupon, at predefined process 490, the MCU is reset (see FIG. 2 and corresponding text for reset processing details). On the other hand, if the device allows hot connections, then decision 420 branches to "yes" branch 430 whereupon, at step 435, the first circuit (e.g., the BDC circuit) signals that synchronization is in progress with an external device (sync_in_prog) and, at step 440, the device attempts to synchronize with the external device, such as a pod.

A determination is made as to whether the device (MCU) successfully synchronized with the external device (decision 445). If the device did not establish a successful synchronization, then decision 445 branches to "no" branch 450 whereupon, at predefined process 490, the MCU is reset (see FIG. 2 and corresponding text for reset processing details). On the other hand, if a successful synchronization was established between the device (MCU) and the external device (pod), then decision 445 branches to "yes" branch 455 whereupon, at step 460, a command is received from the external device within a preset number of cycles.

A determination is made as to whether an enablement command was received (within the preset number of cycles) to enable the first circuit (decision 465). If the enablement command was not received in the preset number of cycles, then decision 465 branches to "no" branch 470 whereupon, at predefined process 490, the MCU is reset (see FIG. 2 and corresponding text for reset processing details). On the other hand, if the enablement command was received within the preset number of cycles, then decision 465 branches to "yes" branch 475 whereupon, at step 480, the first circuit (e.g., the BDC circuit) is enabled by setting a control bit (e.g., ENBDM) and the MCU continues running in normal mode. Hot connection processing thereafter ends at 495. At this point, the user could enter commands through the common pin to read and write memory locations or force the MCU into active background mode.

Figure 5:
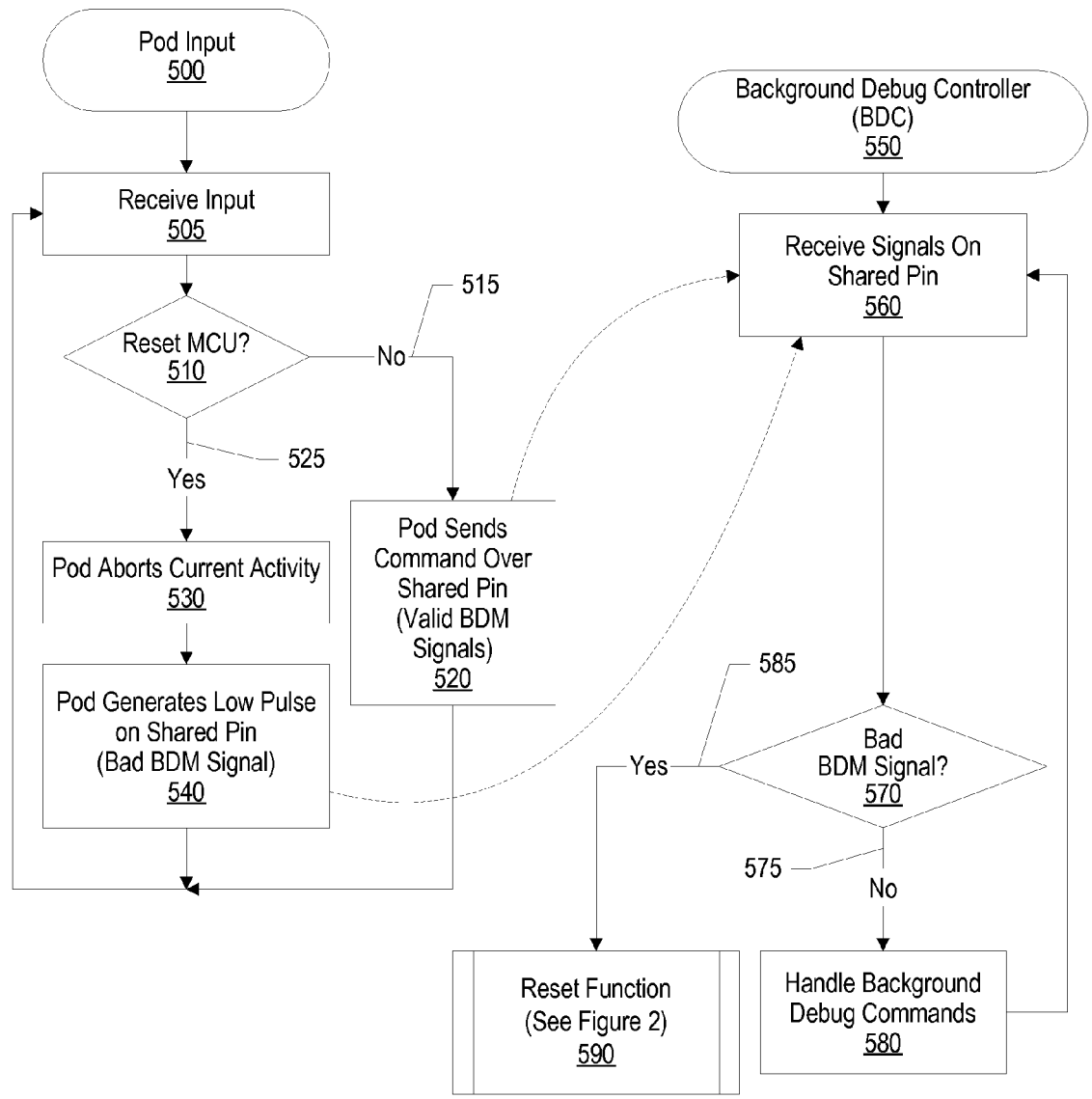
FIG. 5 is a flowchart showing communications between the external device and the MCU's Background Debug Controller (BDC)

FIG. 5 is a flowchart showing communications between the external device and the MCU's Background Debug Controller (BDC). Processing that takes place at the external device, such as a pod, is shown commencing at 500, while the processing that takes place at the device (MCU) is shown commencing at 550. At step 505, the external device receives a command. In one embodiment, a user interacts with an interface, such as a keyboard, attached to the external device to generate the input. A determination is made as to whether the input that was received is requesting that the device (MCU) be reset (decision 510). If the request is not to reset the MCU, then decision 510 branches to "no" branch 515 whereupon, at step 520, the external device sends valid signals (e.g., valid Background Debug Mode (BDM) signals) over the common (shared) pin to the device (MCU). On the other hand, if the request received at the attached device is to reset the attached MCU, then decision 510 branches to "yes" branch 525 whereupon, at step 530, the external device aborts any activity that was currently being performed and, at step 540, the external device (pod) sends a reset signal on the common (shared) pin to the device (MCU). In one embodiment, the reset signal is a low pulse which is not a valid BDM signal.

Turning now to the device's (MCU's) handling of the signals, MCU processing commences at 550 whereupon, at step 560, the signals sent over the common (shared) pin are received at step 560. A determination is made as to whether a bad signal has been received over the common pin (decision 570). In one embodiment, a bad signal is a low pulse signal or any signal that is not a valid BDM signal. If a bad signal has not been received, then decision 570 branches to "no" branch 575 whereupon, at step 580, the first circuit (e.g., the Background Debug Controller circuit) handles the command and then loops back to receive and process the next signal received at the common pin. This looping continues until a bad signal is received at the common pin, in which case decision 570 branches to "yes" branch 585 causing the MCU to reset (predefined process 590, see FIG. 2 and corresponding text for processing details). As is explained in the description of FIG. 2, during reset processing the first circuitry (e.g., the BDC circuit) is disabled and can be subsequently enabled if the MCU is successfully synchronized with an external device, such as a pod.

Figure 6:
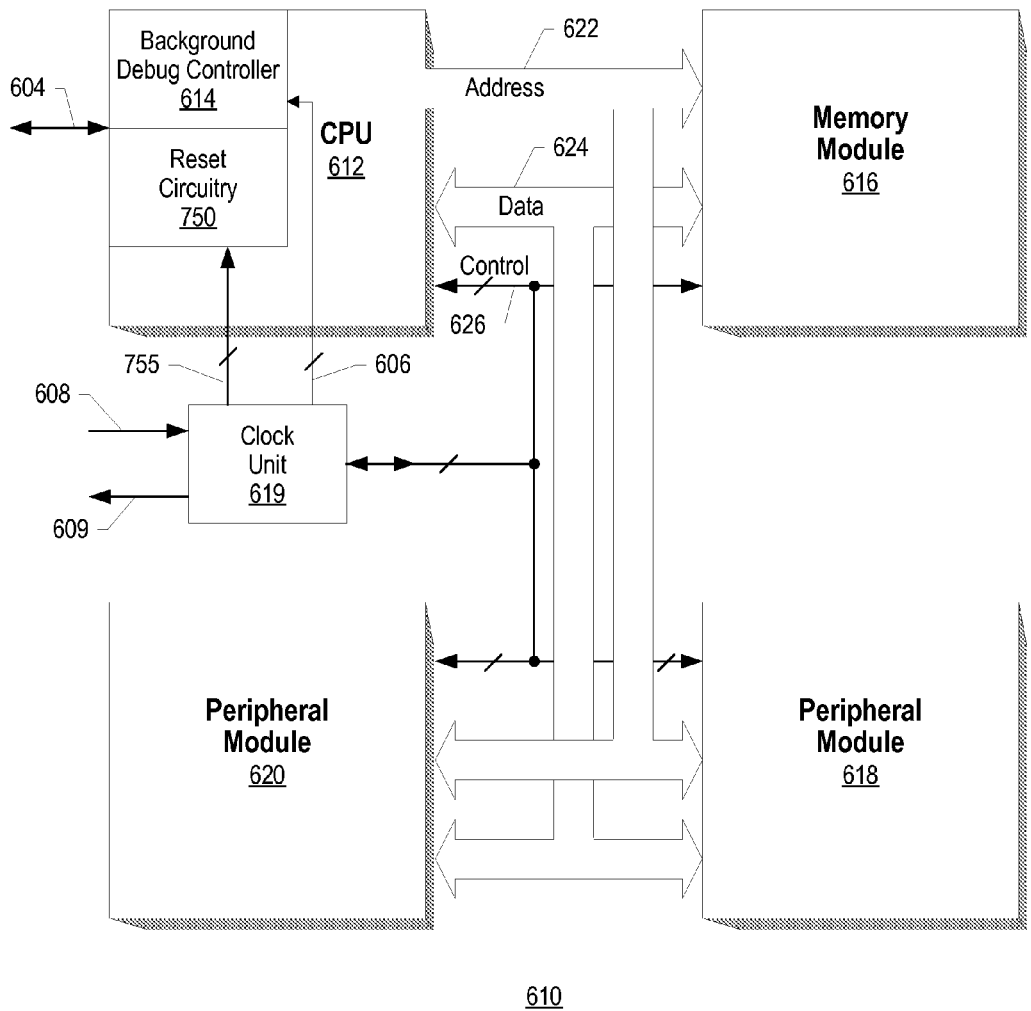
FIG. 6 is a block diagram of a data processing system in which the methods described herein can be implemented.

FIG. 6 is a block diagram of a data processing system in which the methods described herein can be implemented. FIG. 6 illustrates, in block diagram form, a data processing system 610 in accordance with one embodiment of the present invention. Data processing system 610 can be any processing system such as a microcontroller, microprocessor, digital signal processor (DSP), or the like. Data processing system 610 includes CPU 612, clock unit 619, memory module 616, peripheral modules 618 and 620, internal address bus 622, internal data bus 624, and control signals 626. CPU 612 includes background debug controller (BDC) circuitry 614 and reset circuitry 750. Common pin 604 is a serial communication interface connected to both BDC 614 and reset circuitry 750. Internal data bus 624, internal address bus 622, and control signals 626 are coupled between CPU 612 and each of the peripheral modules on data processing system 610. Clock unit 619 is coupled to CPU 612 via control signals 626 and to BDC circuitry and the reset circuitry with signals 606 and 755. Clock unit 619 also includes interface signals 608 and 609 for coupling to an oscillator circuit (not shown).

In operation, CPU 612 receives and executes instructions from a software program stored in memory module 616 via data bus 624. CPU 612 then directs or uses other resources of the data processing system to perform certain tasks. Memory module 616 may be any type of memory including, but not limited to, static random access memory, dynamic random access memory, or any type of non-volatile memory, such as for example, flash or EEPROM. Peripheral modules 618 and 620 are additional modules, such as for example, another memory module, an analog-to-digital converter, a timer module, a serial communications module, for example, a general purpose input/output module, or the like.

Clock unit 619 provides clock signals (606 and 755) to BDC 614 and reset circuitry 750, respectively. Clock unit 619 also receives and provides control signals via control signals 626. For example, clock unit 619 provides clock signals to CPU 612 and receives a STOP signal via control signals 626. Clock unit 619 also provides system clocks to CPU 612, BDC 614, reset circuitry 750, memory module 616, and peripheral modules 618 and 620.

Figure 7:
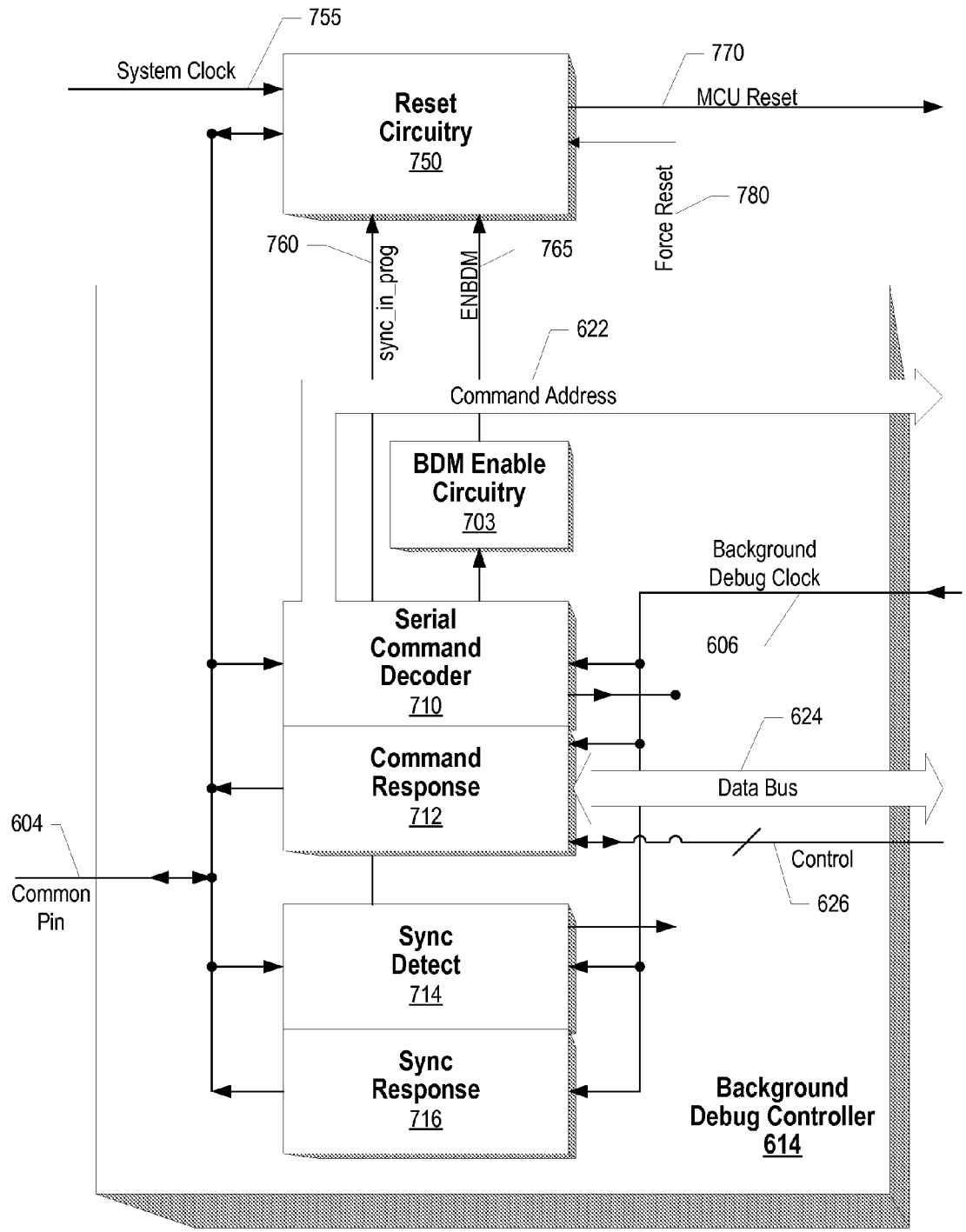
FIG. 7 is a block diagram illustrating the background debug system and reset circuitry of FIG. 6.

FIG. 7 is a block diagram illustrating the background debug system and reset circuitry of FIG. 6. FIG. 7 illustrates one embodiment of BDC 614 and reset circuitry 750 of FIG. 6 in more detail. Common interface pin 604, which receives signals from an external host development system (i.e. an external debug host system such as a pod), is coupled to serial command decoder block 710, command response block 712, synchronization (sync) detect block 714, and synchronization (sync) response block 716. Background debug clock signal 606 controls the timing of operations in serial command decoder block 710, command response block 712, sync detect block 714, and sync response block 716. Command response block 712 is also coupled to data bus 624 and control signals 626 to allow serial background commands to read or write memory and register values or to initiate debug commands such as GO, TRACE, or enter-active-BACKGROUND. Serial command decoder 710 is also coupled to BDM enable circuitry 703 which provides EN_BDM 765 (enable background debug mode) to reset circuitry 750.

BDM enable circuitry 703 may include a control register for storing EN_BDM 765 as one of its control bits or may include other circuitry designed to assert EN_BDM 765. In one embodiment, EN_BDM 765 may be a bit stored in a control register that is only accessible by a background debug command issued by a host development system via common interface pin 604. This prevents user code from being able to purposely or inadvertently assert EN_BDM 765 and engage a STOP signal override (not shown). In alternate embodiments, EN_BDM 765 may not be stored as a control bit and may instead be asserted by logic circuitry that detects when valid debug communications are taking place via common interface pin 604. Alternate embodiments may use different mechanisms and circuitries, other than those described in reference to BDM enable circuitry 703, for asserting EN_BDM 765 to enable BDC 614. In addition, BDM enable circuitry 703 may also include a hot connect control register bit that indicates whether a hot connection is permitted between data processing system 610 and an external device over common interface pin 604 without operating reset circuitry 750.

During background debug operations, serial commands and data are received via common interface pin 604 and decoded by serial command decoder 710. Serial command decoder 710 may send a command address 622 to an address generation unit (not shown) which is located in CPU 612. Command response block 712 then performs the requested command using signals in data bus 624 and control signals 626. For some commands, data is written to data processing system 610 via data bus 624 and control signals 626. For other commands, data is read from data processing system 610 via data bus 624 and control signals 626 and sent back to the external device, such as a pod, as a serial data stream over common interface pin 604. In this example protocol, the line coupling an external device to common interface pin 604 is asserted low for 34 cycles and released for 32 cycles during reset circuitry processing. If the common pin is still asserted low after being released for 32 cycles, then an external reset source is assumed and Background Debug Controller 614 attempts to synchronize with an external device over common interface pin 604.

Reset circuitry 750 receives sync_in_progress signal 760 from sync detect circuitry when an external device attempts to synchronize with data processing system 610. Reset circuitry 750 receives system clock signal 755 from clock unit 619

(shown in FIG. 6). Reset circuitry 750 also receives ENBDM signal 765 from BDM Enable Circuitry 703. ENBDM signal 765 indicates whether background debug mode has been enabled. Reset circuitry's handling of signals over common interface pin signal 604 are based, in part, on the ENBDM signal. When ENBDM is not set, then a signal received at common pin 604 is treated as a reset signal by reset circuitry 750 resulting in MCU reset signal 770 being asserted. If ENBDM is set, then signals received at common pin 604 are treated as background debug commands that are handled by serial command decoder 710. If a bad signal is detected by serial command decoder 710, then BDC signals reset circuitry 750 and reset circuitry 750 performs reset processing which results in the assertion of MCU reset signal 770. Reset circuitry 750 also receives force reset signal 780 from serial command decoder 710 and sync detect unit 714. Serial command decoder 710 asserts force reset 780 when a valid BDM command is not received from an external device (e.g., a pod) over common pin 604. Sync detect unit 714 asserts force reset 780 when the MCU is unable to synchronize with an external device that is attempting to connect to the MCU. Receiving reset signal 780 results in reset circuitry 750 resetting the MCU.

Although the invention has been described with respect to specific conductivity types or polarity of potentials, skilled artisans appreciate that conductivity types and polarities of potentials may be reversed. For example, signals designed as active high may be designed as active low, and those designed as active low may be designed as active high. One of ordinary skill in the art would understand how to modify the circuitry to accommodate such changes.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim 1ncludes the introductory phrases "one or more" or "at least one" and indefinite articles such as "a" or "an;" the same holds true for the use in the claims of definite articles.

What is claimed is:

1. A computer-implemented method comprising:
   receiving one or more signals at a common pin included in a microcontroller unit (MCU);
   in response to determining that a first circuit has been enabled in the MCU:
   analyzing the received signals;
   in response to the analysis identifying a command encoded in the received signals, performing the command using the first circuit; and
   in response to the analysis not identifying the command, performing a preset function using a second circuit; and
   in response to determining that the first circuit has not been enabled at the MCU, performing an alternate function that includes attempting to synchronize the MCU with an external device over the common pin.

2. The method of claim 1 wherein the first circuit is a background debug controller, the command is a background debug command, the second circuit is a reset circuit, and the preset and alternate functions are a reset routine.

3. The method of claim 1 wherein performing the preset function further comprises:
   driving the common pin for a first plurality of cycles;
   after the driving, releasing the common pin for a second plurality of cycles;
   in response to determining that the common pin is still being driven after the releasing, attempting to synchronize with an external device over the common pin; and
   enabling the first circuit in response to successfully synchronizing with the external device.

4. The method of claim 1 wherein the first circuit is disabled in response to the analysis not identifying the command encoded in the received signals.

5. The method of claim 1 wherein, the alternate function further includes:
   determining whether a hot connection is allowed at the MCU,
   wherein the attempting to synchronize with the external device over the common pin is performed in response to determining that the hot connection is allowed; and
   in response to successfully synchronizing with the external device, enabling the first circuit in response to receiving an enablement command from the external device within a preset number of cycles.

6. The method of claim 5 further comprising:
   in response to determining that the hot connection is not allowed, performing the preset function, wherein the preset function is an MCU reset function;
   performing the MCU reset function in response to an unsuccessful synchronization with the external device; and
   performing the MCU reset function in response to not receiving the enablement command within the preset number of cycles.

7. The method of claim 5 wherein the first circuit is a background debug controller circuit and the second circuit is a reset circuit, the method further comprising:
   after enabling the first circuit, receiving one or more background debug commands over the common pin; and
   processing the background debug commands by the background debug controller circuit.

8. The method of claim 7 further comprising:
   receiving a bad background debug signal after processing the background debug commands;
   in response to receiving the bad background debug signal:
   disabling the first circuit; and
   resetting the MCU using the reset circuit.

9. A computer-implemented method comprising:
   receiving, from an external device, one or more signals at a common pin included in a microcontroller unit (MCU) that includes a first and a second circuit, wherein the first circuit is initially disabled;
   attempting to synchronize with the external device; and
   in response to successfully synchronizing with the external device, enabling the first circuit in response to receiving an enablement command from the external device within a preset number of cycles, wherein the enablement command is encoded in one or more of the signals received from the external device at the common pin.

10. The method of claim 9 further comprising:
performing the second function in response to an unsuccessful synchronization with the external device, wherein the preset function is an MCU reset function; and
performing the MCU reset function in response to not receiving the enablement command within the preset number of cycles.

11. The method of claim 10 further comprising:
after enabling the first circuit, receiving one or more command signals at the common pin; and
processing, by the enabled first circuit, commands corresponding to the received command signals.

12. The method of claim 11 further comprising:
receiving a bad signal at the common pin after processing the command signals;
in response to receiving the bad signal:
disabling the first circuit; and
invoking the second circuit.

13. A data processing system comprising:
a processor used to execute a plurality of instructions;
a clock unit that sets one or more clock cycles;
a first circuit connected to the processor;
a second circuit connected to the processor;
a plurality of interface pins, wherein one of the interface pins is a common pin shared by the first and second circuits;
enablement circuitry that operates to enable processing of command signals received at the common pin by the first circuit when an external device, connected to the interface pins, is successfully synchronized with the data processing system; and
operation of the second circuit when signals are received at the common pin that are not processed by the first circuit.

14. The data processing system of claim 13 wherein the first circuit is a background debug controller circuit, the command signals correspond to background debug commands, and the second circuit is a reset circuit.

15. The data processing system of claim 13 wherein operation of the second circuit further comprises:
logic that drives the common pin for a first plurality of clock cycles;
after the driving, logic that releases the common pin for a second plurality of clock cycles;
synchronization logic that determines that the common pin is still low after the second plurality of clock cycles and attempts to synchronize with the external device over the common pin; and
enablement logic operated by the enablement circuitry that enables the first circuit in response to successfully synchronizing with the external device.

16. The data processing system of claim 13 wherein operation of the first circuit further comprises:
logic that disables the first circuit in response to receiving a bad command signal at the common pin.

17. The data processing system of claim 13 further comprising:
a register connected to the processor that includes a hot connection bit that indicates whether a hot connection is allowed by the data processing system;
hot connection logic that attempts to synchronize with the external device over the common pin when the hot connection bit is set; and
enablement logic operated by the enablement circuitry that enables the first circuit when an enablement command is received at the common pin within a preset number of clock cycles after the data processing system is successfully synchronized with the external device.

18. The data processing system of claim 17 further comprising:
logic to operate the second circuit when a signal is received at the common pin and the hot connection bit is not set;
logic to operate the second circuit in response to an unsuccessful synchronization between the data processing system and the external device; and
logic to operate the second circuit in response to not receiving the enablement command within the preset number of clock cycles.

19. The data processing system of claim 17 wherein the first circuit is a background debug controller circuit and the second circuit is a reset circuit, the microcontroller unit further comprising:
analysis logic that identifies a bad command signal received at the common pin after the external device is successfully synchronized with the data processing system; and
disablement logic that operates the second circuit and disables the first circuit in response to identifying the bad command signal.

20. The data processing system of claim 19 wherein the external device is a pod and wherein the number of interface pins is less than or equal to 8.

* * * * *